United States Patent [19]

Mesheau

[11] Patent Number: 5,026,488

[45] Date of Patent: Jun. 25, 1991

[54] LIQUID RECYCLING SYSTEM

[75] Inventor: John S. Mesheau, Granby, Mass.

[73] Assignee: Butler Associates, Ludlow, Mass.

[21] Appl. No.: 482,342

[22] Filed: Feb. 20, 1990

[51] Int. Cl.⁵ .......................................... B01D 17/02
[52] U.S. Cl. ..................................... 210/799; 210/245
[58] Field of Search ............... 210/167, 168, 171, 181, 210/182, 199, 142, 241, 257.1, 258, 295, 259, 245, 799

[56] References Cited

U.S. PATENT DOCUMENTS

| | | | |
|---|---|---|---|
| 1,962,463 | 6/1934 | Renfrew | 196/16 |
| 2,685,347 | 8/1954 | Busby | 184/1.5 |
| 3,954,611 | 5/1976 | Reedy | 210/71 |
| 4,049,548 | 9/1977 | Dickerson | 210/96 |
| 4,153,553 | 5/1979 | Davis | 210/95 |
| 4,377,475 | 3/1983 | Wiedemann | 210/136 |
| 4,378,290 | 3/1983 | Kennedy | 210/103 |
| 4,416,590 | 11/1983 | Colucci | 417/231 |
| 4,514,294 | 4/1985 | Layman et al. | 210/87 |
| 4,543,183 | 9/1985 | Petretti | 210/187 |
| 4,636,317 | 1/1987 | Lewis | 210/748 |
| 4,751,006 | 1/1988 | Becker | 210/774 |
| 4,772,402 | 9/1988 | Love | 210/804 |

*Primary Examiner*—Bernard Nozick
*Attorney, Agent, or Firm*—Malcolm J. Chisholm, Jr.

[57] ABSTRACT

An apparatus and method is disclosed for recycling contaminated industrial liquids. In the preferred embodiment, a conventional, medium-sized "van" type of truck houses, transports and powers a dual-loop assembly. A filter-loop assembly receives and stores recycling liquid in a waste liquid holding tank. The liquid is pumped through a pasteurizing heater and a separating centrifuge and back to the tank. Filter-test valves in the filter-loop enable testing to determine desired heating and separation.

When flow-rate adjustments produce satisfactory heating and separation, the recycling liquid is directed through a cooler, out of the filter-loop and into an additive-loop assembly where the liquid is pumped from a clean liquid holding tank, by additive compound injections, and back to the clean tank. Additive-test valves in the additive-loop enable testing to determine required quantities of specific additive compounds. When tests indicate satisfactory levels of the compounds, the recycling liquid is directed out of the additive-loop assembly and out of the system. The filter and additive test valves enable periodic testing during recycling to insure consistency. If the recycling becomes inadequate, the filter-loop and/or additive-loop is closed until changes in the flow-rate or additive injection rates again produce satisfactory recycling.

24 Claims, 8 Drawing Sheets

LIQUID RECYCLING SYSTEM

BACKGROUND OF THE INVENTION

The present invention relates to mechanical devices and methods for recycling contaminated liquids.

Demand for recycling of contaminated industrial liquids has increased dramatically in recent years as a result of growing concern over the deleterious environmental impact of unregulated disposal of such liquids. The current costs of proper disposal of certain industrial liquids, such as metalworking coolants and lubricants, frequently exceed their purchase costs. Consequently, maximizing the useful life of such liquids, through recycling, offers significant economic and environmental benefits.

Metalworking coolants and lubricants are but a typical example of a vast array of industrial liquids that pose potential environmental hazards and are amenable to recycling. Other examples include hydraulic fluid for operating hydraulic motors and vehicle lifts, used motor oil, antifreeze and many petroleumbased liquids contaminated with water-based liquids, and vice versa.

Some progress has been made in providing recycling devices for specific needs. Large users of certain liquids have installed on-site recycling systems that utilize fine screens to separate particulate contaminants, and centrifuges to separate components of immiscible liquids. Large manufacturers may employ a recycling processing system that moves within a plant to different metalworking machines to filter the machine tool coolant, as shown in U.S. Pat. No. 4,772,402 to Love. Smaller manufacturers could utilize a trailer or truck borne device, on a periodic basis, that screens, pasteurizes and then centrifuges metalworking coolants, as shown in U.S. Pat. No. 4,636,317 to Lewis.

Unfortunately, none of these alternatives have gained widespread acceptance. The principal impediments to the commercial viability of such recycling devices are, first, the extraordinary variety of environmentally hazardous industrial liquids and, second, the diverse nature of the users of such liquids. From General Motors Corporation to corner automobile service stations and small metalworking "job shops", industrial coolants, lubricants and related liquids are employed in huge quantities under varying conditions.

Some liquids are employed at a specific temperature range that encourages rapid bacterial growth, producing corrosive metabolites and related by-products. Another user may employ the exact same liquid at a different temperature such that the resulting contamination problem is primarily from particulate matter or possibly contamination with an insoluble liquid. A particular user may exhaust a substantial quantity of a first specific liquid while only a smaller quantity of a second hazardous liquid is depleted during the same period of time. Acquisition of an on-site recycling system may not include recycling of both liquids due to the differing characteristics of the liquids. Known mobile recycling devices may not economically recycle both liquids. Therefore, such a user could tend to invest in premature, off-site disposal only, because some off-site disposal would always be necessary.

Additionally, most contaminated industrial liquids are stored in a manner that complicates recycling. Storage containers of the liquids typically produce stratified layers. A top layer may consist of foam with fine particulate matter ("fines") adhering to bubbles. An intermediate layer below the foam may include the lighter of two insoluble liquids, such as a petroleumbased liquid. The bulk of the liquid may be another lower layer of a heavier insoluble liquid, with a final bottom layer of settled fines and precipitated by-products of microbial activity.

Known systems for recycling such contaminated liquids are designed to operate on liquids having specific characteristics. The systems cannot be readily altered to adapt to different liquids or the stratified layers found in specific, contaminated, stored liquids. The systems are designed to set an intake side of the recycling system to a specific flow-rate appropriate to produce specific temperature ranges and centrifugation effects. Once the intake flow-rate is set, the systems operate on a straight-run mode affording no mid-run testing and change to satisfy requirements of changing characteristics of the liquid as a storage container is depleted, or when the intake moves from one storage container (e.g., a fifty-five gallon barrel) to another.

Another reason known recycling systems have not attained wide-spread commercial success is that certain industrial liquids contain a variety of chemical additives in relatively small quantities. These additives are very important in determining the effectiveness of the liquids. They include biocides (bacterial growth suppressing agents), pH buffers, emulsifying agents, antifoam chemicals, deodorizers, concentrated liquid boosters, among others. The depletion or deterioration of such agents varies with the nature of use and conditions of storage of the liquids. Current recycling systems are unable to monitor the additive requirements of filtered liquids during recycling. Post recycling testing to determine additive requirements is a lengthy, costly and ineffective procedure.

Still another problem with existing recycling systems is the substantial energy requirement to economically operate the systems. The energy required to heat typical contaminated liquids to an effective pasteurizing temperature, at a flow-rate that is commercially viable, requires known mobile trailer or truck borne systems to utilize electrical energy provided at the storage site of the contaminated liquid. Although this is possible at some large facilities, such a requirement presents significant logistical problems in most circumstances. Additionally, the billing complications arising from such an energy-use arrangement deters periodic utilization of a mobile recycling systemcontractor.

Consequently, because of structural limitations, known liquid recycling systems are unable to effectively recycle the wide variety of hazardous industrial liquids or service the periodic recycling needs of most hazardous liquid users.

Accordingly, it is the general object of the present invention to provide an improved liquid recycling system that overcomes the problems of the prior art.

It is another general object to provide an improved liquid recycling system that offers an inexpensive alternative to costly premature disposal of hazardous industrial liquids.

It is a more specific object to provide a liquid recycling system that can readily change its filtering capacities to efficiently service a variety of different hazardous industrial liquids.

It is another object to provide a liquid recycling system that can readily change its filtering capacities, while recycling a hazardous industrial liquid.

It is another object to provide a liquid recycling system that affords monitoring of chemical additive requirements of the liquid being recycled, and provides for metering of such additives into the liquid, during recycling.

It is yet another object to provide a liquid recycling system that is mobile and self-powered.

The above and other objects and advantages of this invention will become more readily apparent when the following description is read in conjunction with the accompanying drawings.

SUMMARY OF THE INVENTION

An improved liquid recycling system is disclosed for recycling hazardous industrial liquids. The system includes mechanical components that are housed within, and transported by, a conventional, medium-sized, enclosed "van" type of truck. All the components are powered by the engine of the van.

In the preferred embodiment, the invention comprises a sequential, dual-loop assembly affixed to a contaminated liquid intake head; a master control panel and test station integrated with the loops; and, a recycled-liquid discharge nozzle. A first, or filter-loop assembly receives contaminated liquid that has passed through fine screen filters. The liquid is pumped from a waste liquid holding tank, through a pasteurizing heater, to kill bacteria and lower the liquid's viscosity, and a centrifuge, to further separate fine particles and undesirable insoluble liquids. Then the liquid is pumped back to the waste liquid holding tank, and cooled, completing the filter-loop.

The master control panel monitors and controls the temperature of the liquid in the filter-loop by measuring the preheating and post-cooling temperature and allowing an operator to regulate flow-rates through the heater and cooler to increase or decrease the temperature. The control panel includes a test station which provides for post-centrifuge extraction of a sample of the liquid to test the quality of separation produced by the centrifuge. The operator can adjust the flow-rate into the centrifuge to adjust the separation produced by it to the desired rate. Flow-rate through the centrifuge and resulting separation quality can also be regulated by altering the viscosity of the liquid through pre-centrifuge control of the temperature of the liquid. The operator repeats the testing of the liquid within the filter-loop until the desired flow-rate, post-cooling temperature and liquid quality are attained. The liquid is then directed into a clean liquid holding tank.

Then the liquid is pumped through a second, or additiveloop assembly. The liquid flows from the clean liquid holding tank to a second liquid extraction test valve on the control panel where a sample is extracted for testing. The test determines the quantity of needed additives. Additive-flow control metering valves on the control panel are adjusted to inject into the liquid the required additives at the rates determined by the test. The liquid is then pumped back into the clean liquid holding tank, and circles through the additive-loop, until test liquid satisfies the target requirements for the particular liquid being recycled. When the requirements are met, the liquid is discharged to recycled liquid storage tanks.

In use, an operator first takes a core sample of the liquid to be recycled. A transparent tube extracts the core sample of the liquid as it is stored. From the tube, the operator can visually determine the extent of stratification of the stored liquid and anticipate the sequence of adjustments, if any, that will be needed to compensate for the stratification. For example, if water-based metalworking liquids are being recycled, typically a layer of oil-based contaminants will occupy a top region of the storage container and the layer will have a distinctive color that is different than the color of the lower, water-based liquid.

A vacuum hose for the liquid recycling system is also transparent and an intake head is placed well below the oil-based, liquid layer so that the water-based liquid is withdrawn first. When the operator observes the distinctive color of the oil-based layer in the intake line, adjustments are made to insure its proper recycling. If necessary, further intake is stopped until the liquid already on-board is completely recycled, and then the distinctive colored liquid enters the system and is thoroughly tested within the filter and additive loops prior to discharge.

As the recycling system is operated, the operator administers regular periodic tests of liquid in the filter and additive loops. If any corrections are needed, the operator can make them during the recycling. The loop needing correction may be closed, stopping discharge out of the loop, until the flowrate or the injection rate of additives is adjusted to again produce satisfactory liquid.

Most pumps and the centrifuge are operated by electrically actuated, mechanical, power takeoffs from the engine of the van. Remaining pumps are operated by electrical energy provided by the van's engine. Coolant from the engine of the van provides heat, raising the temperature of the recycled liquid, while coolant from the air conditioner of the van is used to cool the liquid back down, to inhibit post-filtration bacterial growth and afford immediate utilization of the recycled liquid. Consequently, a wide variety of hazardous industrial liquids in differing conditions of storage can be recycled by this mobile, self-powered, liquid recycling system.

DETAILED DESCRIPTION OF THE PREFERRED EMBODIMENT

Figure 1:
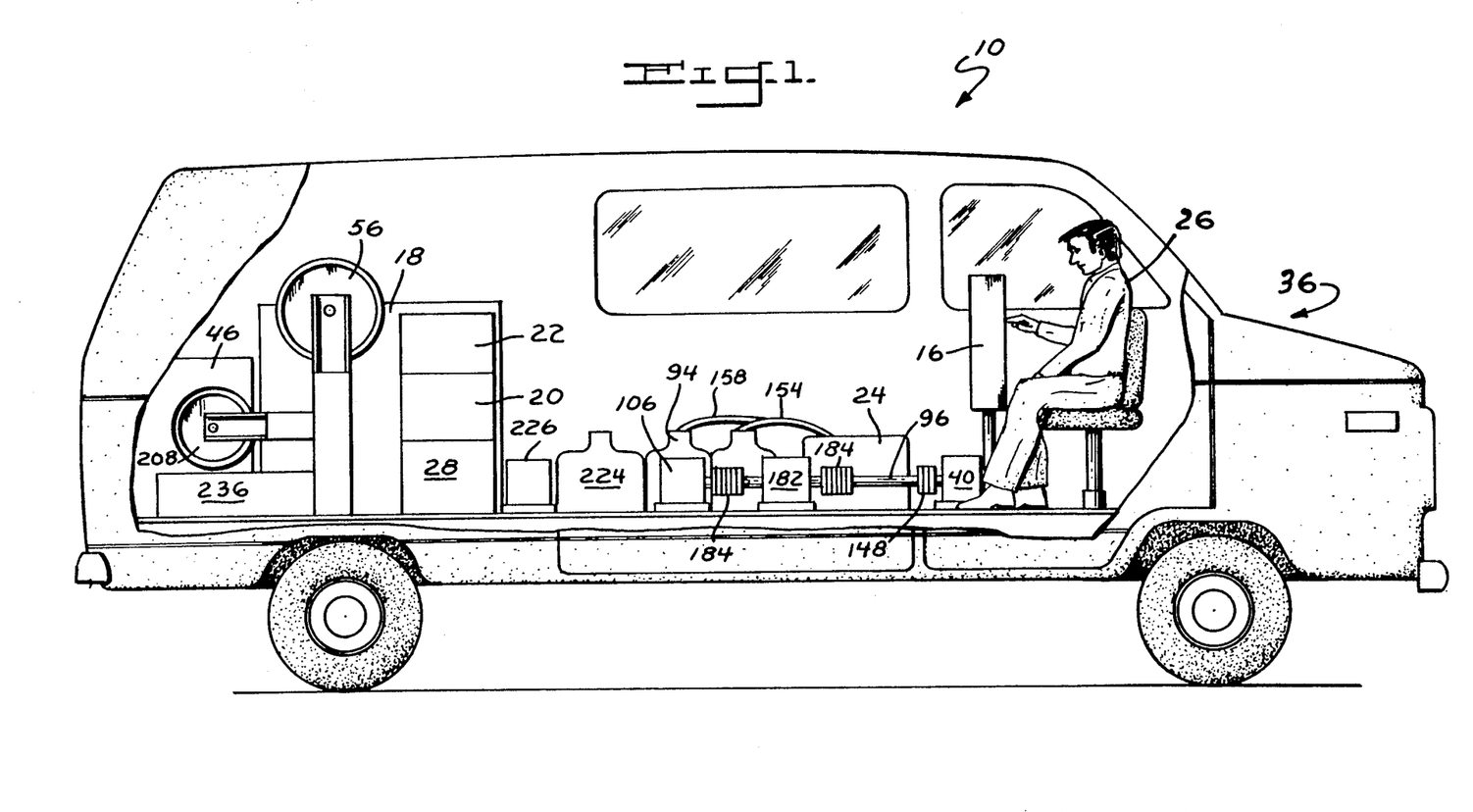
FIG. 1 is a side perspective view of a liquid recycling system constructed in accordance with the present invention wherein the system is housed within, powered and transported by a conventional "van" type of truck, with a side and roof of the van partially cutaway to show the system during operation.
Figure 2:
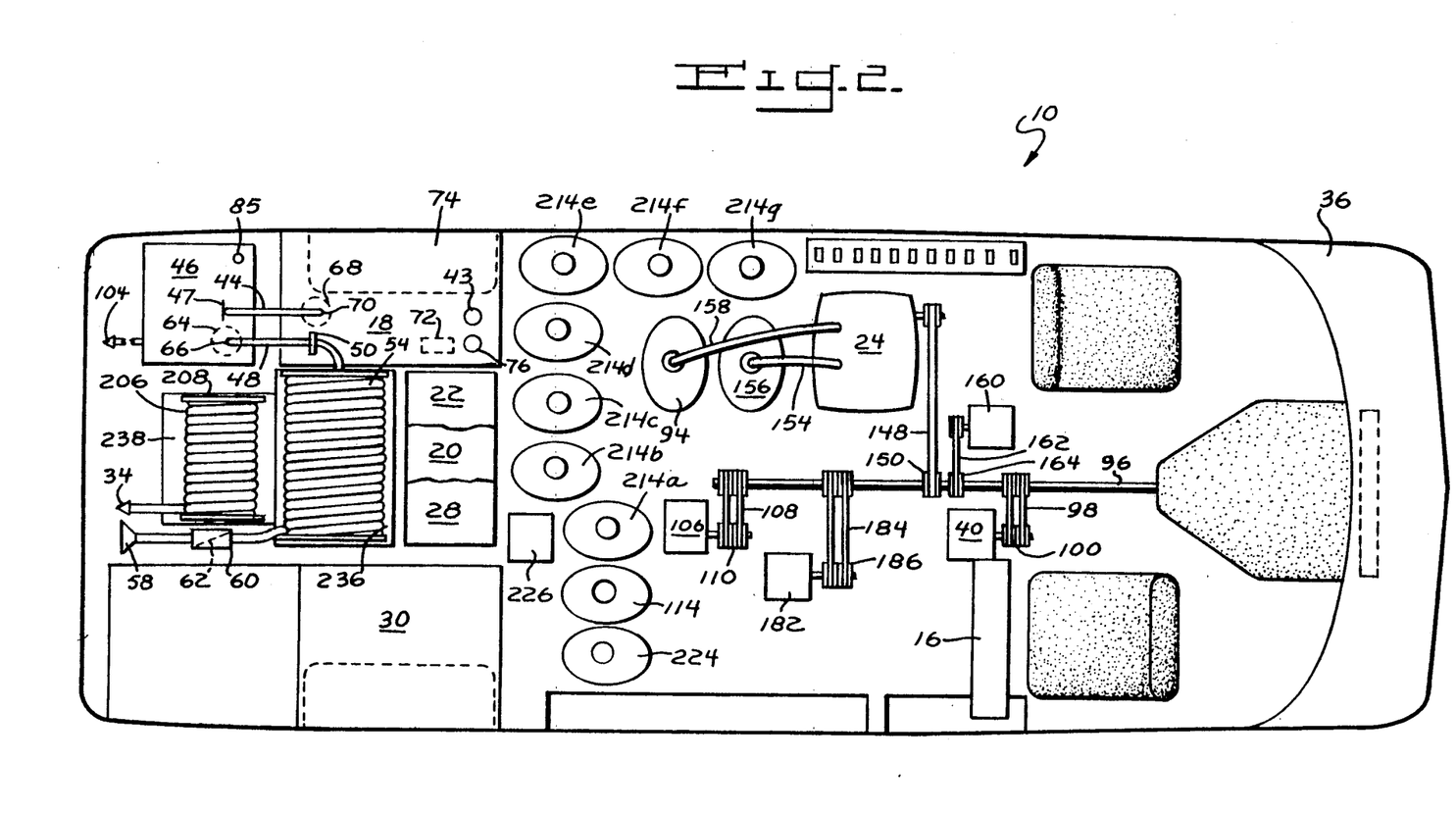
FIG. 2 is a fragmentary top plan view of the liquid recycling system of FIG. 1, with the roof of the van cutaway to show a floor plan of the system.
Figure 3:
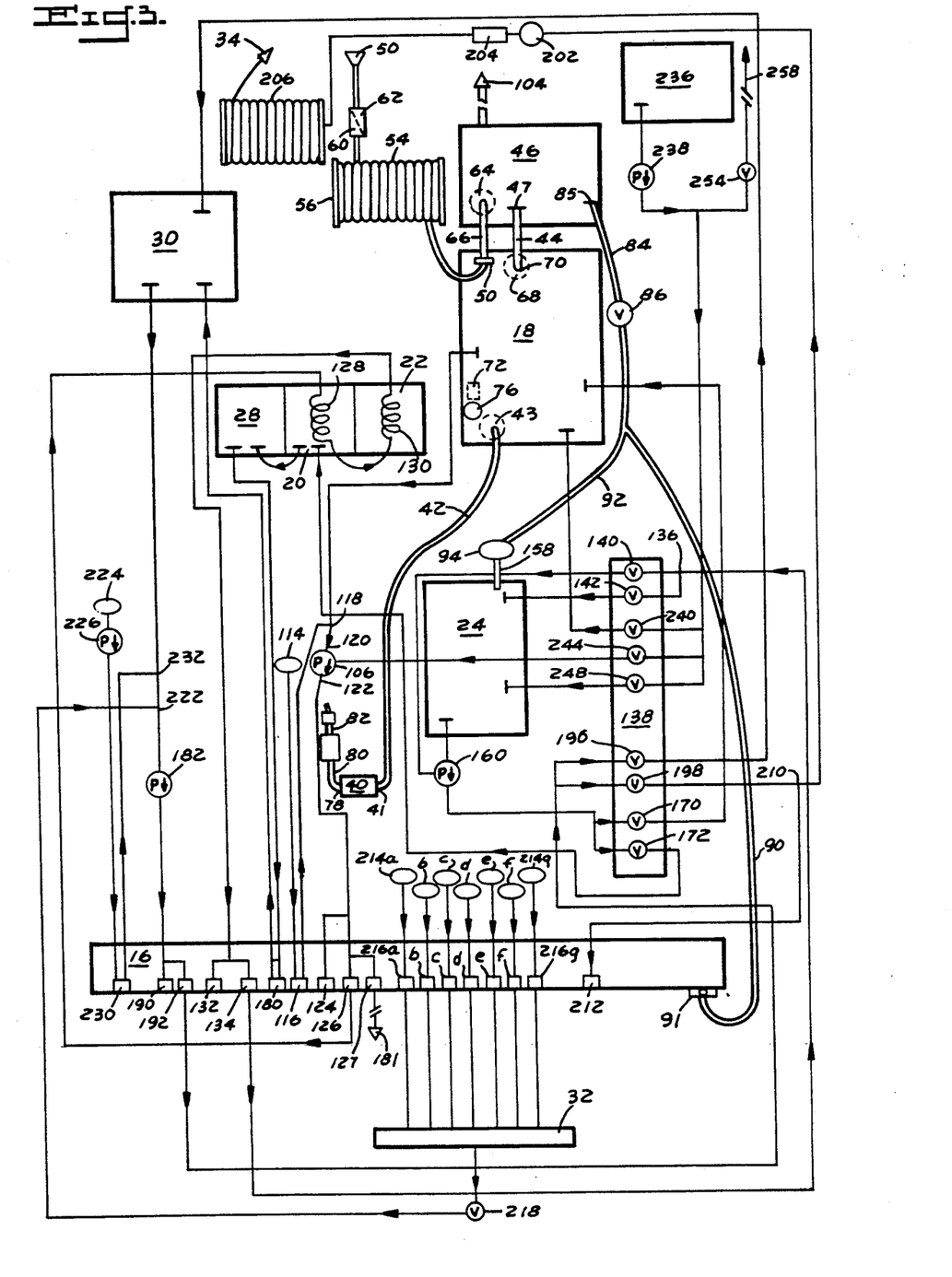
FIG. 3 is a block diagram of the liquid recyclying system of the present invention.

Referring to the drawings in detail, the preferred embodiment of a liquid recycling system is shown and generally designated by the number 10. FIGS. 1-3 show overall views of the invention and FIGS. 4–8 show portions thereof. The invention basically comprises a filter-loop 12 (FIG. 5) integrally associated with an additive loop 14 (FIG. 6), both of which are monitored and controlled through a master control panel 16 (FIG. 8) to filter and add depleted and/or rejuvenating compounds to hazardous industrial liquids, thereby recycling them.

Figure 5:
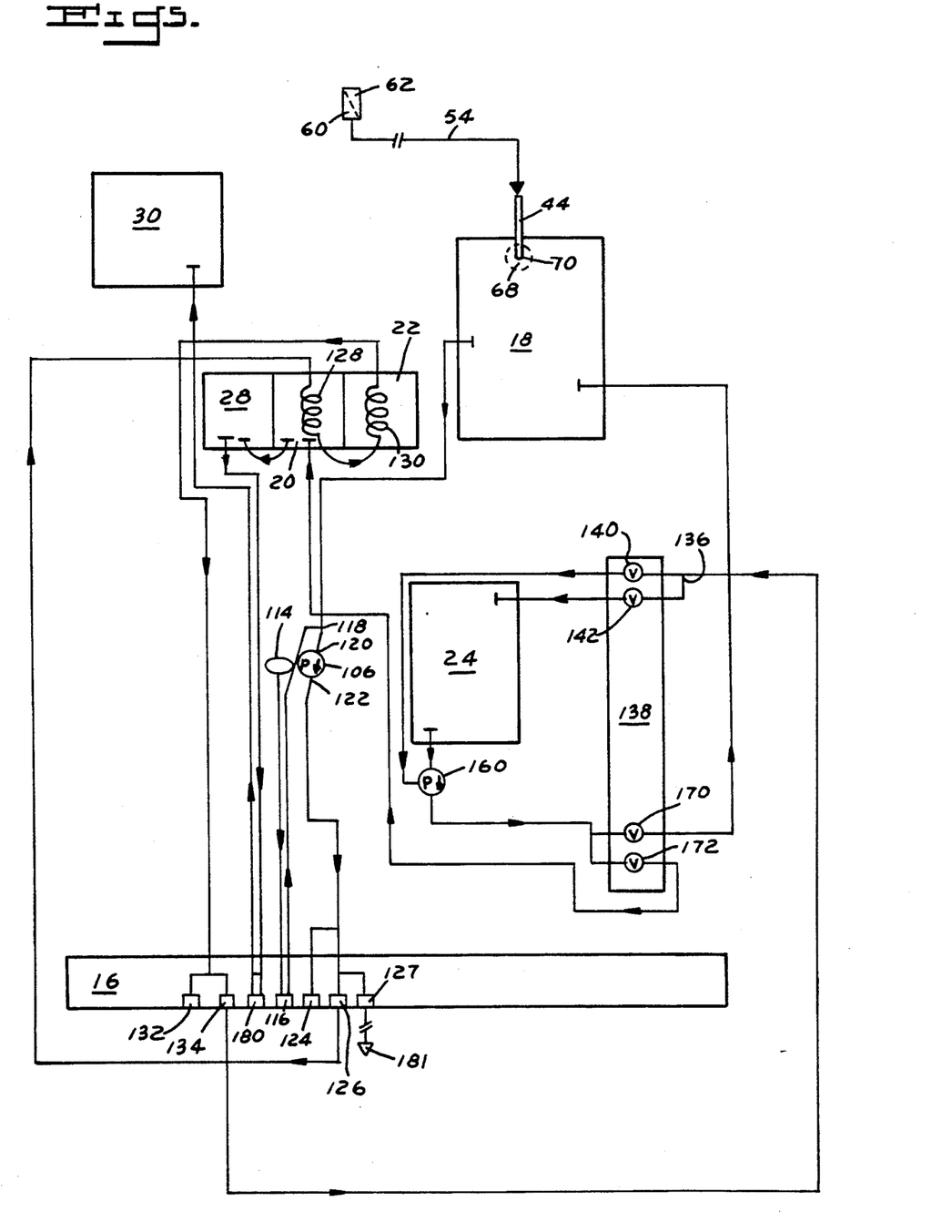
FIG. 5 is a block diagram of a filter-loop assembly used in the recycling system.

As best shown in FIG. 5 in the filter-loop 12, liquid to be recycled (hereafter "recycling liquid") is stored in waste liquid holding tank 18 and then pumped through a preheater/cooler 20, and a heater 22 to pasteurize the liquid and change its viscosity. Then the recycling liquid passes through a centrifuge or mechanical separator 24 to separate out fine particles and insoluble unwanted liquids. The liquid is then pumped back to the waste liquid holding tank 18. An operator 26 controls the temperature and flow-rate of the liquid, via the master control panel 16, thereby effecting the quality of the liquid exiting the centrifuge 24. When the quality is satisfactory, the operator directs the recycling liquid to a cooler 28 instead of the waste holding tank 18. The cooler reduces the temperature of the recycling liquid so that it can be used immediately. The lower temperature also inhibits bacterial growth. From the cooler 28, the liquid flows to a clean liquid holding tank 30, completing the filter-loop 12.

Figure 6:
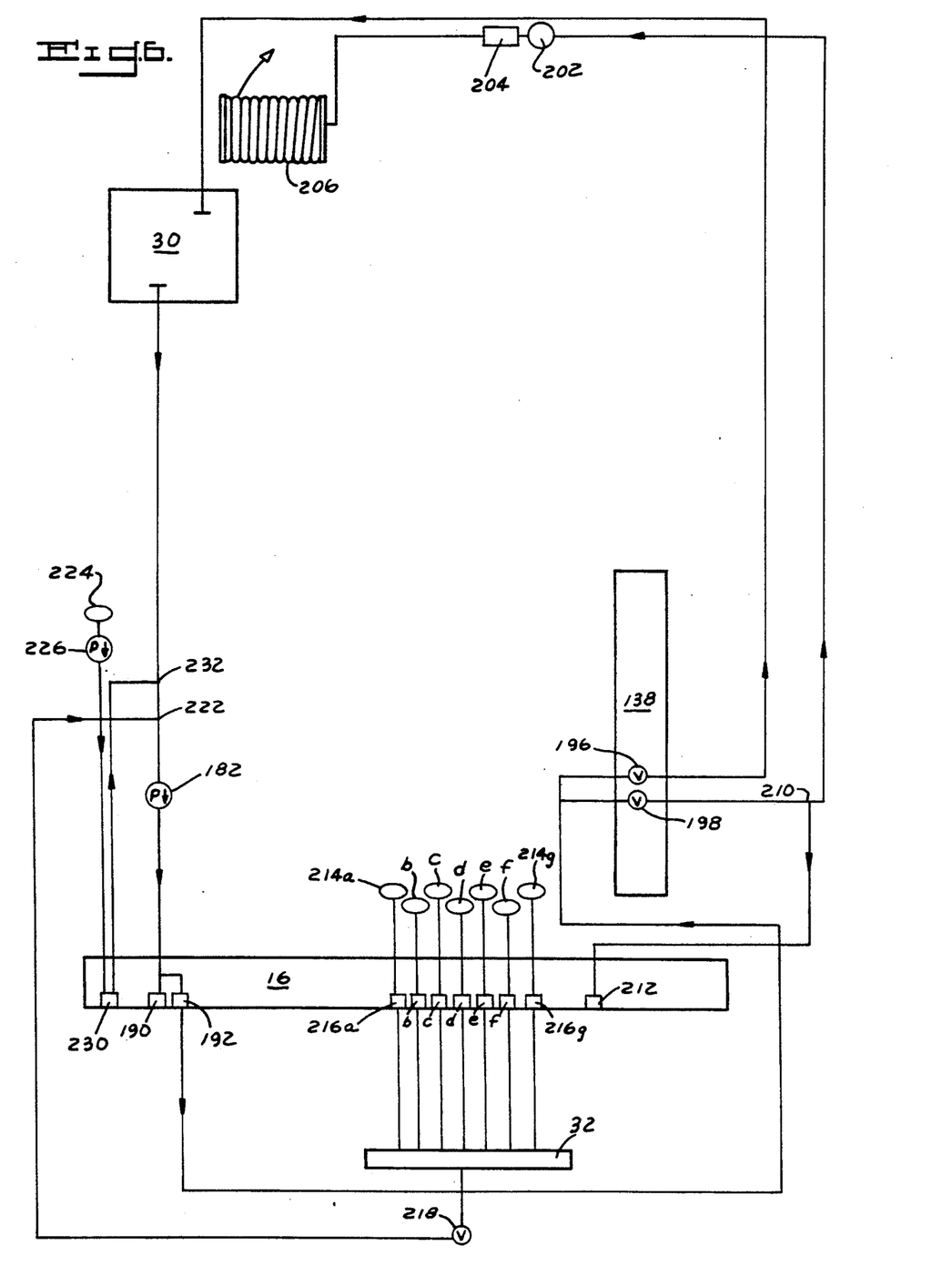
FIG. 6 is a block diagram of an additive-loop assembly used in the recycling system.

As seen in FIG. 6, in the additive-loop 14, recycling liquid is pumped from the clean liquid holding tank 30 through the control panel 16 where a plurality of chemical additives can be selectively metered into the liquid through an additive manifold 32. The liquid flows back to the clean liquid holding tank 30 until tests by the operator 26 at the control panel 16 indicate the recycling liquid meets or exceeds target specifications Then, the liquid is directed out of the additive-loop 14 and out of the liquid recycling system 10 through a discharge nozzle 34. The liquid recycling system 10 is housed within, transported and powered by a conventional "van" 36 type of truck.

Figure 4:
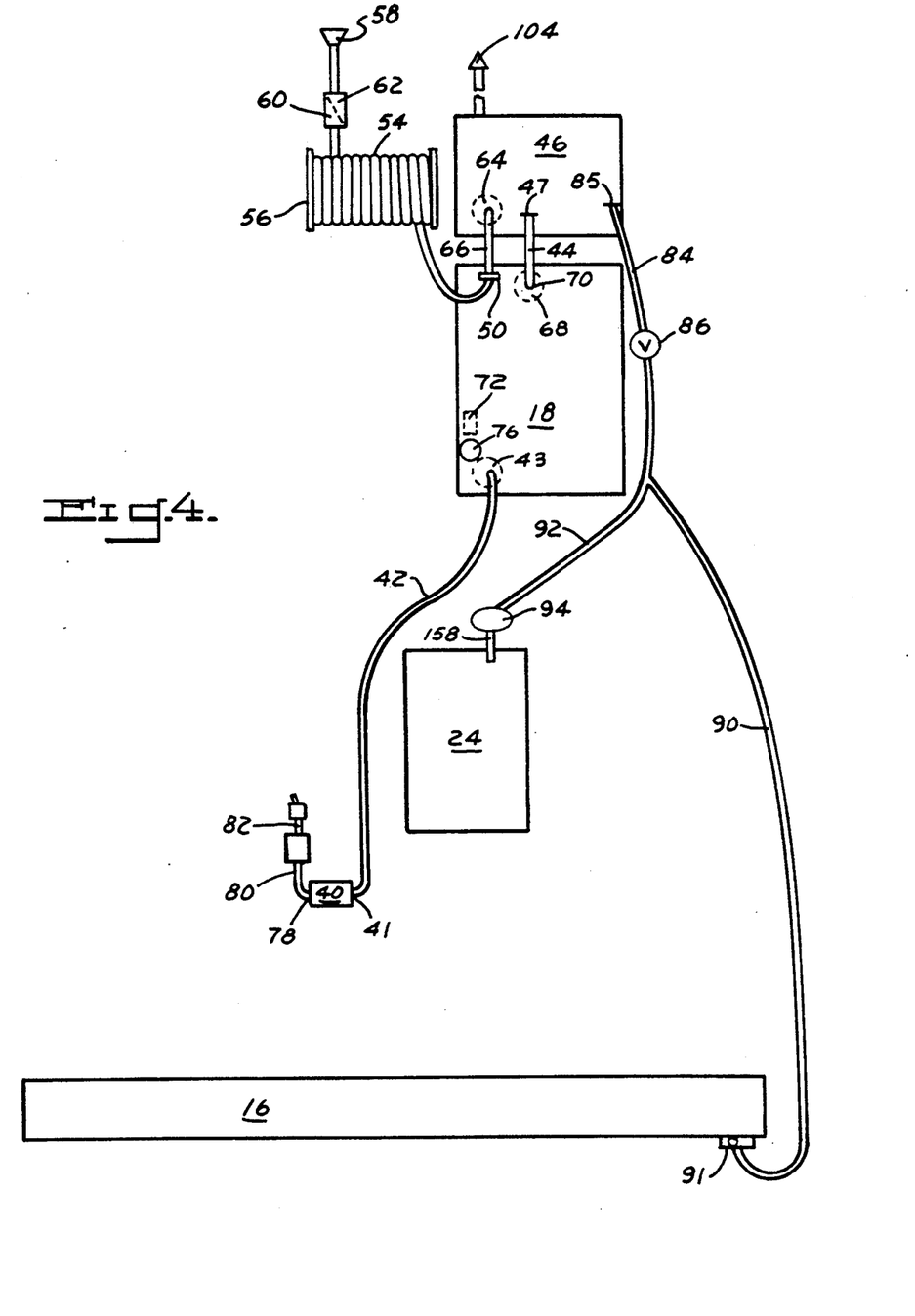
FIG. 4 is a block diagram of a vacuum mechanism of the recycling system.

As best shown in FIG. 4, the liquid recycling system 10 includes a vacuum mechanism 38 that allows recycling liquid to be taken into the liquid recycling system 10 with no contact between the liquid and a vacuum blower or pump 40 that creates suction to take in the liquid. Known vacuum blowers are effective for this purpose such as vacuum blower Model No. 65109020, manufactured by Roots/Dresser, Inc. of Pittsburgh, Penn.

A suction side 41 of vacuum blower 40 is in fluid connection with main vacuum line 42 which leads and, in operation, applies suction to waste liquid holding tank 18 through suction inlet 43. Interconnecting vacuum line 44 interconnects the waste holding tank 18 and a waste disposal tank 46. An open end 47 of interconnecting vacuum line 44 is adjacent to, and, in operation, applies suction to, a bottom area (not shown) of waste disposal tank 46. Affixed to, and in fluid connection with, the waste disposal tank 46 is a vacuum intake line 48. Vacuum intake solenoid valve 50 opens up and shuts off flow through vacuum intake line 48 and is actuated by vacuum intake solenoid switch 52 located on the master control panel 16, and in electrical connection with valve 50. Vacuum hose 54 is in fluid connection with vacuum intake line 48 and is mounted on vacuum reel 56. The vacuum hose 54 is made of known transparent plastic materials and has an intake head 58 mounted upon an end of the hose 54 that rolls off of the reel to extend and descend into a storage container (not shown) for liquid to be recycled.

Vacuum mechanism 38 includes a fine filter screen trap box 60 between intake head 58 and vacuum reel 56, in fluid connection with vacuum hose 54. The trap box 60 has a first disposable fine filter screen bag 62 through which all recycling liquid must flow. A second disposable fine filter screen bag 64 is located below, and in fluid connection with, a second recycling liquid inlet 66 in waste disposal tank 46. A third disposable fine filter screen bag 68 is located below, and in fluid connection with, a third recycling liquid inlet 70 in waste holding tank 18. First, second and third disposable fine filter screen bags 62, 64, 68 are constructed of known filter material of varying pore sizes, such as nylon.

Also included in vacuum mechanism 38 is a float switch 72 affixed to a top-side 74 of waste holding tank 18. The float switch 72 is in electrical connection with vacuum blower 40 so that the blower is switched off when the amount of recycling liquid in the waste holding tank 18 exceeds a pre-set level on the switch 72. A vacuum-breaker valve 76 is also affixed to the topside 74 of the waste holding tank 18. The valve 76 opens to let air into tank 18 when the pressure within the tank drops below a pre-set level.

As seen in FIG. 4, an exhaust side 78 of vacuum blower 40 is in fluid connection with blower exhaust line 80, which leads to, and is affixed to, exhaust pipe 82. Also shown in FIG. 7, an accumulated-waste suction line 84 is affixed to a waste line inlet 85 in waste disposal tank 46. A waste line solenoid valve 86 intersects accumulated-waste suction line 84 and is electrically actuated by waste line switch 88 on the control panel 16. Test liquid drain suction line 90 is in fluid connection with, and affixed to, the accumulated-waste suction line 84, adjacent to the waste line solenoid valve 86, and connects accumulated-waste suction line 84 to a test liquid-disposal tray 91 at the master control panel 16. Centrifuge wash suction line 92 is in fluid connection with and affixed to the accumulated-waste suction line 84, adjacent the waste line solenoid valve 86, and connects accumulated waste suction line 84 to a centrifuge wash product storage container 94.

As shown in FIG. 2, vacuum blower 40 is powered by a power takeoff shaft 96. The power takeoff shaft 96 is designed and manufactured by the inventor herein. Essentially, it utilizes a conventional belt-drive pulley mechanism (not shown) with belts interconnecting a pulley on the crank shaft of the van's 38 engine (not shown) and a standard electric clutch on the shaft 96. The shaft spins a first conventional belt drive mechanism 98 and blower electric clutch 100. A blower electric clutch switch 102 located on the control panel 16 actuates the blower 40 by engaging the blower electric clutch 100 while the shaft 96 is spinning.

In operation, the vacuum mechanism 38 applies suction, when the blower 40 is turned on, through the main vacuum line 42, the waste liquid holding tank 18, the waste disposal tank 46, the vacuum intake line 48, the vacuum hose 54, and the intake head 58. When the operator 26 inserts the intake head 58 into a container of liquid to be recycled, the liquid responds to the suction and flows through the intake head 58, vacuum hose 54, intake line 48, waste disposal tank 46 and into the waste liquid holding tank 18. In so traveling, the recycling liquid passes through the first, second and third disposable fine filter bags, 62, 64, 68 respectively without being exposed to any moving parts or any pump components.

After recycling is completed, the operator can close vacuum intake solenoid valve 50 from its switch 52 and open waste line solenoid valve 86 from its switch 88, while the vacuum blower 40 is applying suction to waste disposal tank 46. That allows any recycling liquid discarded to the test liquid disposal tray 91 to be sucked into disposal tank 46, as well as any waste products washed from the centrifuge 24 and stored in the centrifuge wash product storage container 94. The discarded test recycling liquid and centrifuge waste products can then be removed from the waste disposal tank 46 through the waste disposal valve 104 when appropriate.

As best shown in FIGS. 2 and 5, in the filter-loop 12 portion of the liquid recycling system 10, recycling liquid is pumped by, via conventional piping (not shown), and passes through, a filter-loop pump 106. Pump 106 is a commercially available pump, such as pump model number 560 manufactured by Cat Pumps, Inc. of Minneapolis, Minn. As seen in FIG. 2, pump 106 is powered by power takeoff shaft 96, which spins a second conventional belt drive mechanism 108 and filter-loop pump electric clutch 110. A filter pump electric clutch switch 112, located in the control panel 16, actuates the filter-loop pump 106 by engaging its electric clutch 110 while shaft 96 is spinning.

Certain types of recycling liquid tend to produce foam. The filter-loop 12 includes a de-foaming compound container 114. A standard, known de-foaming compound, such as "De Foamer", manufactured by Eviron-Lub, Inc., of Indian Orchard, Mass., stored in container 114, flows, via conventional piping (not shown), from container 114, to a de-foamer metering valve 116 in control panel 16 and then to a de-foamer "T"-joint 118 adjacent to a suction side 120 of filter-loop pump 106. Direct flow of the recycling liquid straight through the "T"-valve 118 provides sufficient suction upon the de-foaming compound, flowing perpendicular to the recycling liquid, to draw the de-foaming compound into the flowing recycling liquid at a rate determined by the de-foamer metering valve 116.

Recycling liquid exits an exhaust side 122 of filter-loop pump 106 and flows, via conventional piping (not shown), to a filter-loop pressure gauge 124; filter-loop flow-rate control valve 126; and recycling abort valve 127, all of which are located in the control panel 16. The recycling liquid then flows to the pre-heater/cooler 20, which is an enclosed box-like structure, that has directional, flow-control baffles (not shown) and coiled piping or tubing 128 within. The recycling liquid flows through the tubing 120 absorbing heat, out of pre-heater/cooler 20 and into the heater 22. The heater is very similar in structure to the pre-heater/cooler 20, including coiled tubing 130, through which the recycling liquid flows absorbing even more heat from a heat-transfer medium, and directional, flow-control baffles (not shown) within a box-like structure. The heat transfer medium within the heater 22 is an antifreeze-based coolant of the van's 36 engine (not shown). The medium is directed through conventional, insulated, heater-type hoses (not shown) from the van's engine to the heater 22, and back to the engine. The medium absorbs heat from the engine of the van, which is running during operation of the liquid recycling system.

From the heater 22, recycling liquid flows back to the control panel 16 to a post-heating temperature gauge 132 and a transparent, glass flow-rate gauge 134. The liquid then flows through a centrifuge "Y"-joint 136 adjacent to solenoid valve panel 138. The "Y"-joint 136 splits the recycling liquid flow to either a centrifuge bypass solenoid valve 140 or a centrifuge entry solenoid valve 142, both of which are on the solenoid panel 138. Both valves 140, 142 are controlled by a centrifuge flow switch 144 located on the master control panel 16. The sWitch 144 operates such that, if centrifuge entry solenoid valve 142 is open, then centrifuge bypass solenoid valve 140 must be closed, and vice versa.

Depending upon which of the centrifuge valves 140, 142 is open and which is closed, the recycling liquid can either by-pass or enter the centrifuge 24. The centrifuge is a standard "ringdam" centrifuge for separating fine suspended particles from a liquid and for separating immiscible liquids, such as centrifuge model number 4042230 manufactured by Alfa-Laval, Inc. of Poughkeepsie, N.Y. As seen in FIG. 2, centrifuge 24 is powered by power takeoff shaft 96 that spins a third conventional belt drive mechanism 148 and centrifuge electric clutch 150. A centrifuge electric clutch switch 152, located in the master control panel 16, actuates the centrifuge by engaging the centrifuge electric clutch 150 while shaft 96 is spinning.

When the centrifuge 24 is operating, separated, undesirable liquid, flows through separated liquid pipe 154 to a separated liquid storage container 156. Separated particles are stored within the centrifuge 24 and washed out of it, after recycling, through separated particle pipe 158 to the centrifuge wash product storage container 94.

Recycling liquid that by-passes the centrifuge, or recycling liquid that is separated by the centrifuge, flows to a roller pump 160. The roller pump 160 is a standard, commercially available pump, such as model number 6500 C, manufactured by Hypro, Corp. of New Brighton, Minn. As seen in FIG. 2, the roller pump is powered by power takeoff shaft 96 that spins a fourth conventional belt drive mechanism 162 and roller pump electric clutch 164. A roller pump electric clutch switch, 166, located in the master control panel 16, actuates the roller pump by engaging the roller pump electric clutch 164 while shaft 96 is spinning.

As seen in FIG. 3, recycling liquid flows from the roller pump 160, via conventional piping (not shown), to a post-centrifuge "Y"-joint 168, which splits the recycling liquid flow to either a waste liquid holding tank entry solenoid valve 170 or a cooler entry solenoid valve 172, both of which valves 170, 172, are on the solenoid valve panel. Both valves 170, 172 are controlled by cooler entry switch 174 located on the master control panel 16. The switch 174 operates such that, if waste liquid holding tank entry solenoid valve 170 is open, then cooler entry solenoid valve 172 must be closed and vice versa.

If waste liquid holding tank entry solenoid valve 170 is open, recycling liquid flows back to waste liquid holding tank 18. If cooler entry solenoid valve 172 is open, recycling liquid flows, as best seen in FIG. 5, to pre-heater/cooler 20 where the recycling liquid becomes a heat transfer medium for recycling liquid passing through the coiled tubing of the pre-heater/cooler 20, thereby losing some of its heat. The recycling liquid flows through the directional-flow baffled interior of the preheater/cooler heater/cooler 20 and then into the similarly directional-flow baffled interior of the cooler 28. The cooler includes conventional coiled tubing (not shown) through which flows a cooling medium. The cooling medium is a conventional fluorocarbon compound (e.g., freon) found in air conditioning systems of automobiles and "van" types of trucks. The flourocarbon compound is directed through conventional insulated hoses from the air conditioning system of the va 38 to coiled tubing (not shown) in the cooler 28, and back to the air conditioning system. The flowrate of the fluorocarbon compound through the cooler 28 is controlled by conventional air conditioning valves (not shown) and thereby effects the rate of heat absorption from the recycling liquid passing through the cooler 28.

Recycling liquid leaves the cooler 28 and flows to a post-cooler temperature gauge 178 and a filter-loop liquid test valve 180, where operator 26 can extract some of the recycling liquid for quality testing. The recycling liquid then flows to the clean liquid holding tank 30, and extracted test liquid is held in the test liquid disposal tray 91.

In operation of the filter-loop 12 portion of the recycling system 10, the operator actuates filter-loop pump 106 from the switch 112 for its electric clutch on the control panel 16, thereby directing recycling liquid to flow through the filter-loop flow-rate control valve 126 and through the pre-heater/cooler 20, heater 22, post heating temperature gauge 132, transparent flow-rate gauge 134, centrifuge 24, roller pump 160, and back to the waste liquid holding tank 18. The centrifuge 24 may be by-passed by opening centrifuge bypass solenoid valve 140 until the centrifuge is brought up to operating speed, or during flow-rate alterations to change the temperature of the recycling liquid. The de-foamer metering valve 116 is adjusted to supply adequate defoamer to the recycling liquid.

By observing the recycling liquid passing through the transparent flow-rate gauge 134, the operator can estimate when the recycling liquid has achieved proper separation. Then cooler diversion switch 174 is opened and the recycling liquid flows through the pre-heater/cooler 20, cooler 28 and is extracted at the filter-loop liquid test valve 180 for testing. During testing, test valve 180 and cooler diversion switch 174 are again closed, keeping the recycling liquid out of the clean liquid holding tank 30. If the test results are unsatisfactory, the operator can adjust filter-loop flow-rate control valve 126 until adequate separation is achieved by the centrifuge 24. In the event adequate separation cannot be achieved, the operator terminates recycling by opening the recycling abort valve 127 which directs the recycling liquid out of the liquid recycling system, via conventional piping (not shown), through the recycling abort discharge nozzle 181. When recycling is terminated in this manner, centrifuge bypass solenoid valve 140 is open, allowing the recycling liquid to by-pass the centrifuge 24. When test results are satisfactory, cooler diversion switch 174 is again opened and recycling liquid flows into clean liquid holding tank 30.

As best shown in FIGS. 2 and 6, in the additive-loop 14 portion of the recycling system 10, recycling liquid is pumped by (via conventional piping (not shown)), and passes through, an additive-loop pump 182. Pump 182 is a commercially available pump, such as model number 560, manufactured by Cat Pumps, Inc. of Minneapolis, Minn. As seen in FIG. 2, pump 182 is powered by the power takeoff shaft 96, which spins a fifth conventional belt drive mechanism 184 and additive-loop pump electric clutch 186. An additive-loop pump electric clutch switch 188, located in the master control panel 16, actuates the additive-loop pump 182 by engaging its electric clutch 186, while shaft 96 is spinning.

As seen in FIG. 6, recycling liquid then flows from additive-loop pump 182 to a first additive-loop pressure gauge 190 and an additive-loop liquid test valve 192, where the operator extracts a test sample of the recycling liquid to evaluate what additives are needed to meet target specifications for the recycling liquid. The recycling liquid then flows from the test valve 192, when it is closed, to an additive "Y"-joint 194 adjacent the solenoid valve panel 138. The "Y"-joint 194 splits the recycling liquid to a clean liquid holding tank re-entry solenoid valve 196 and a discharge solenoid valve 198. Valves 196 and 198 are electrically controlled by discharge switch 200 located on the control panel 16, such that when discharge solenoid valve 198 is open, clean liquid holding tank re-entry solenoid valve 196 has to be closed, and vice versa.

When clean liquid holding tank re-entry solenoid valve 196 is open, recycling liquid flows back to the clean liquid holding tank 30. When discharge solenoid valve 198 is open, recycling liquid flows through a disposable discharge micron filter 202, an accumulation meter 204, a discharge hose 206 mounted on a discharge-hose reel 208, and finally through the discharge nozzle into a recycled liquid storage container (not shown). A discharge line "T"-valve 210, adjacent and after discharge solenoid valve 198, diverts some of the recycling liquid to a second additiveloop pressure gauge 212 located on the master control panel 16.

Figure 8:
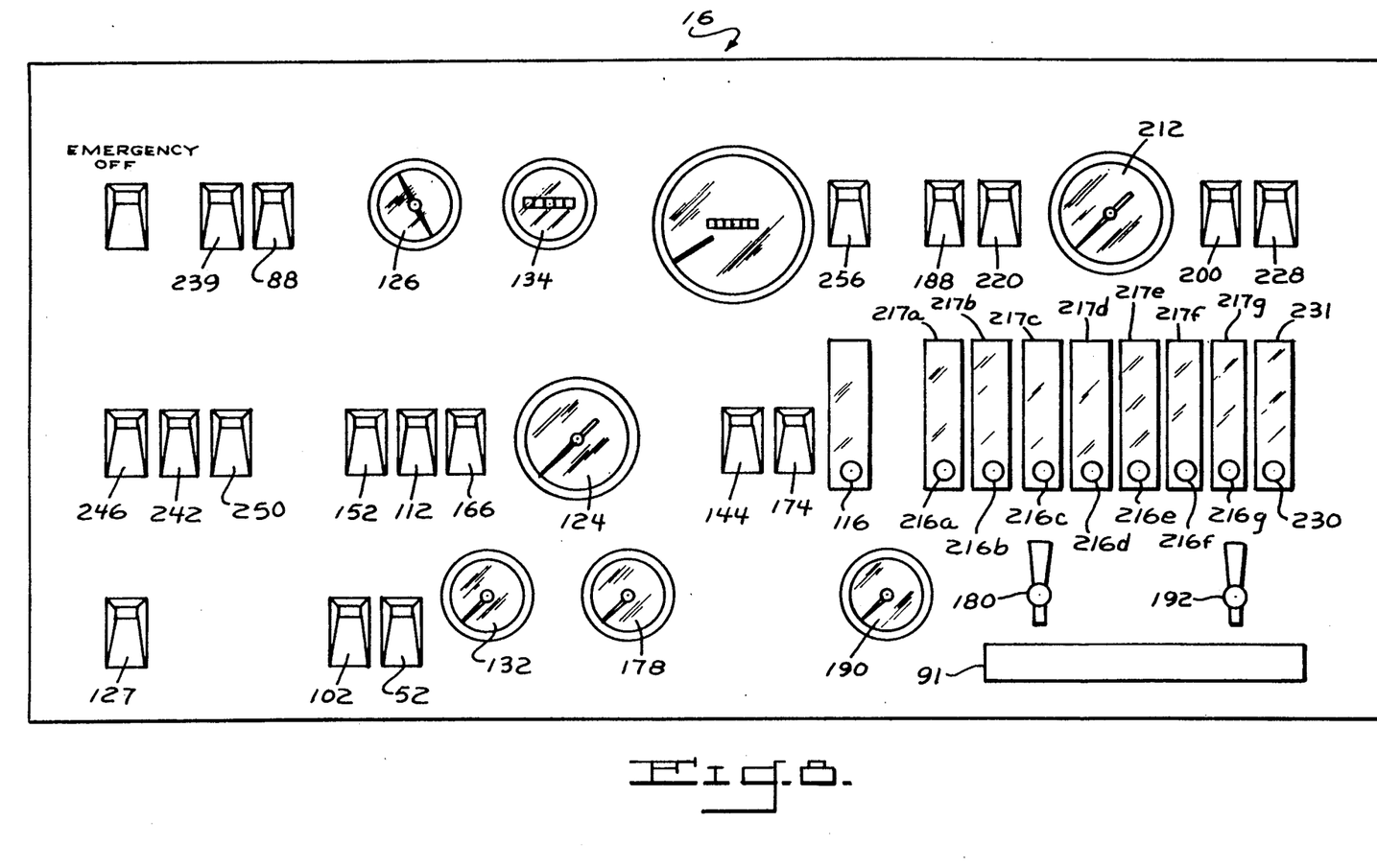
FIG. 8 is a plan view of a master control panel and test station of the recycling system.

As seen in FIG. 6, a plurality of additive compound containers 214a,b,c,d,e,f,g store a variety of additive compounds for injection into the recycling liquid. Illustrative of such compounds, but not to be understood as limiting, are: synthetic rust inhibitors; soluble rust inhibitors; biocides; extreme pressure additives; deodorant agents; blue color dyes; and, green color dyes. The additives flow, via conventional tubing (not shown) to additive metering valves 216a,b,c,d,e,f,g located on the master control panel 16. As seen in FIG. 8, the metering valves include transparent glass tubes 217a,b,c,d,e,f,g through which the additives flow, allowing the operator to precisely measure and monitor flow-rates of the additive compounds. The metering valves are adjustable, to regulate the respective flowrates of the additive compound.

From the master control panel 16, the additive compounds flow to additive manifold 32, where they are mixed. The mixed additive compounds then flow in a single conventional tube (not shown) to an additive manifold solenoid valve 218 which is electrically controlled by additive flow switch 220 located on the master control panel. When the additive flow switch 220 opens the additive manifold solenoid valve 218, the mixed additive compounds flow to a first additive suction "T"-joint 222. "T"-joint 222 is structured so that the mixed additive compounds flow and intersect the flow of recycling liquid at a direction that is perpendicular to the flow of the recycling liquid. Consequently, a suction force is applied to the mixed additive compounds by the flow of the recycling liquid, thereby drawing the mixed additive compounds into the recycling liquid. First additive suction "T"-joint 222 is positioned adjacent to and upstream of additive-loop pump 182.

One particular additive compound varies significantly with each type of recycling liquid. It is referred to in the art as "neat coolant", and consists of a concentrated form of the particular metal working coolant being recycled. Additionally, certain recycling specifications call for very precise concentrations of neat coolant. Consequently, neat coolant is stored in a specific neat coolant container 224 and is injected into the recycling liquid by flowing to, and being pumped by, a separate neat coolant feed pump 226. The feed pump 226 is a commercially available twelve (12) volt pump powered by the van's 38 electrical system, such as pump model number 2100-112, manufactured by Flojet Corp. of 12 Morgan Street, Irvine, Calif. The feed pump is actuated by a conventional electric feed pump switch 226 located on the master control panel 16.

Neat coolant leaves the feed pump 226 and flows to a neat coolant metering valve 230, in the master control panel, which has the same structure, and flow control features as additive metering valves 216a,b,c,d,e,f,g including a transparent glass tube 231 for operator viewing. From the metering valve 230, the neat coolant flows to a second additive suction "T"-joint 232, which has the same structure as the first additive suction "T"-joint 222. Second suction "T"-joint is also positioned to intersect the flow of recycling liquid upstream of additive-loop pump 182, thereby enabling injection of neat coolant into the recycling liquid.

In operation of the additive-loop 14, the operator 26 actuates the additive-loop pump 182 through additive-loop pump electric clutch switch 188 at the master control panel 16. That causes recycling liquid to flow from the clean liquid holding tank 30 through the pump 182; the additive-loop liquid test valve 192; the clean liquid holdinq tank re-entry solenoid valve 196; and, back to the clean liquid holding tank 30. The operator extracts some of the recycling liquid through additive-loop test valve 192 and administers tests to determine the exact amount of additive compounds to inject into the recycling liquid. Additive compound metering valves 216a,b,c,d,e,f,g are then adjusted to meter into the additive manifold 32 specific amounts of additive compounds required, while additive compound solenoid valve 218 is open allowing the additive compounds to tlow into the reoyclinq liquid. The operator also tests the recycling liquid to determine the proper amount of neat coolant to meter into the recycling liquid; actuates neat coolant feed pump 226 through its switch 228; and sets the neat coolant metering valve 230 to allow injection of the required amount into the recycling liquid.

As the additive compounds and neat coolant are injected, and the recycling liquid circles from, and back to, clean liquid holding tank 30, the operator continues testing recycling liquid extracted from the additive-loop liquid test valve 192 until the recycling liquid satisfies specifications. Then the operator opens the discharge solenoid valve 198 by its switch 200 at the master control panel 16. Recycling liquid then flows through a final particle filter, the disposable discharge micron filter 202; through the accumulation meter 204, to measure the volume of recycling liquid discharged; and out of the liquid recycling system through discharge hose 206 and nozzle 34.

When the desired temperature, filtration and separation are achieved by the filter-loop 12, and the desired specifications achieved by the additive-loop 14, both loops are kept operating in a straight-run or discharge-flow sequence, as best shown in FIG. 3. During the discharge-flow sequence, the operator periodically tests the recycling liquid, and interrupts the discharge-flow sequence to make necessary adjustments.

Figure 7:
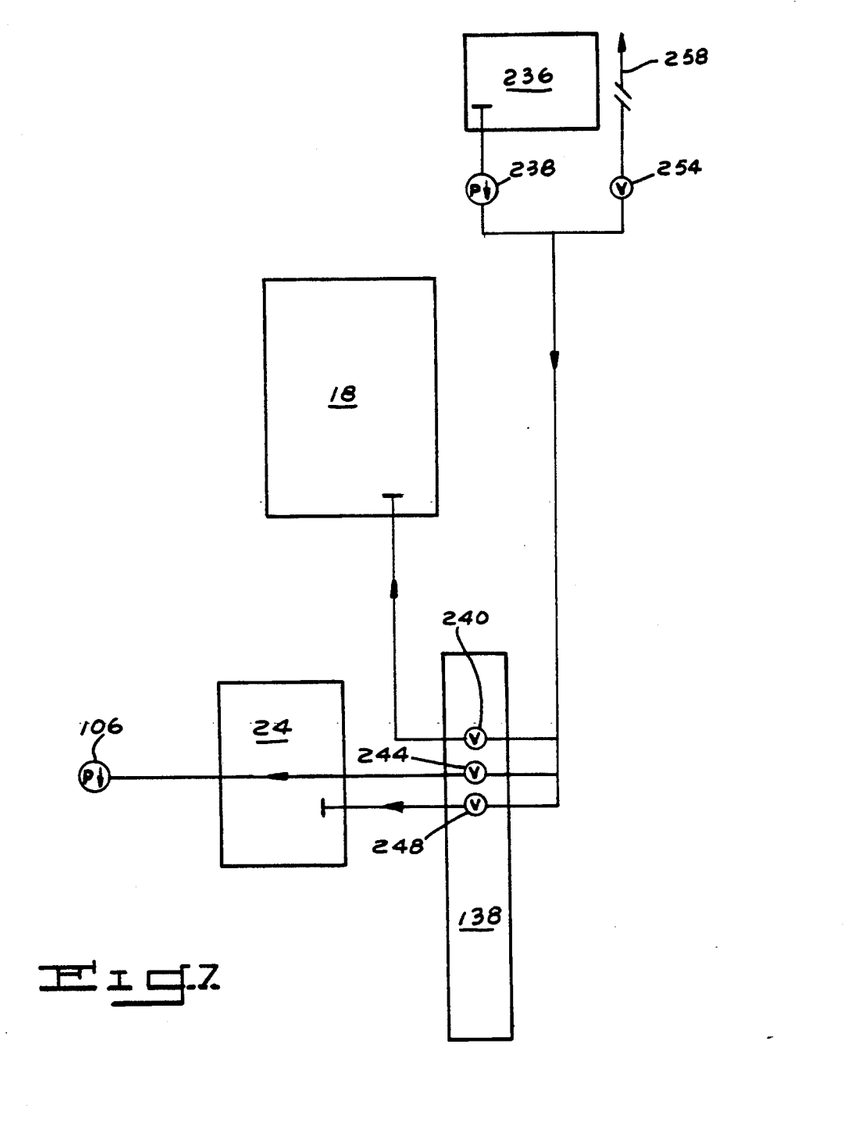
FIG. 7 is a block diagram of a clean-water wash cycle used in recycling system.

As shown in FIG. 7a clean water wash cycle portion 234 of the liquid recycling system allows the operator to clean the liquid recycling system and flush the components that accumulate waste products, after the recycling liquid has been completely discharged. Clean water wash cycle 234 includes a fresh water holding tank 236 located beneath the vacuum reel 56. Water is pumped from the tank 236 by a commercially available twelve-volt clean water pump unit 238, such as pump model number 4300-142A, manufactured by Flojet Corp. of 12 Morgan Street, Irvine, Calif.

The pump unit is powered by electrical energy provided by the van's 38 engine and controlled by a clean water pump switch 239 on the control panel 16. The water then flows, via conventional piping (not shown), to the solenoid panel 138. At the panel, the water is directed to three solenoid valves. The first is a waste liquid holding tank entry solenoid valve 240, which is electrically controlled by a waste tank cleaning switch 242 on the master control panel 16. The second is a pump priming solenoid valve 244, controlled by pump priming switch 246, on the control panel 16. The third is a centrifuge wash solenoid valve 248 controlled by centrifuge wash switch 250 on the panel 16.

When the clean water pump unit 238 is on and waste liquid holding tank entry solenoid valve 240 is open, water flows into the waste liquid holding tank 18 to flush it clean. When pump priming solenoid valve 244 is open, water flows into filter-loop pump 106 to prime it, if needed, to actuate the filter-loop 12. When centrifuge wash solenoid valve 248 is open, water flows into the centrifuge 24 to wash accumulated fine particles out of it, into the centrifuge wash product storage container 94 via a centrifuge wash product pipe 158.

A clean water utility hose entry solenoid valve 254, located adjacent and downstream from, clean water pump unit 238, and controlled by clean water utility hose switch 256, can open to direct the flow of clean water into a utility hose 258 for general cleaning.

When the recycling liquid has been completely discharged, the operator actuates the clean water pump unit 238, by its switch 239; opens waste liquid holding tank entry solenoid valve 240, by its switch 242; and engages the filter-loop 12 and additive-loop 14, with additive manifold solenoid valve 218 and metering valves 116, 216,a,b,c,d,e,f,g, and 230 closed, to completely wash all components of the liquid recycling system 10 and purge any remaining recycling liquids out of the system through discharge nozzle 34. During this time, centrifuge bypass solenoid valve 140 is open, and the centrifuge 24 is on. The operator then opens centrifuge wash solenoid valve 248, permitting water to flush accumulated fines out of the centrifuge 24 and into the centrifuge wash product storage container 94.

When the cleaning is completed, the operator actuates the vacuum blower 40; closes the vacuum intake solenoid valve 50; opens the waste line solenoid valve 86; thereby drawing stored centrifuge wash products in the container 94, and discarded test portions of the recycling liquid in test liquid disposal tray 91, into the waste disposal tank for storage and subsequent discharge through waste disposal valve 104. The operator has then recycled the recycling liquid; washed the liquid recycling system 10; and isolated all waste products.

It should be understood by those skilled in the art that obvious structural modifications can be made without departing from the spirit of the invention. Accordingly, reference should be made primarily to the accompanying claims, rather than to the foregoing specification to determine the scope of the invention.

Having thus described the invention, what is claimed is:

1. A method of recycling contaminated liquid, which comprises:
   a. pumping recycling liquid through a filter-loop assembly that includes the steps of:
      i. adjusting the flow-rate of recycling liquid as it is pumped through the filter-loop assembly;
      ii. heating the flow-rate adjusted recycling liquid;
      iii. passing the heated recycling liquid through a mechanical separator;
      iv. cooling the separated recycling liquid;
      v. testing the separated recycling liquid to determine the quality of separation; and
   b. pumping the recycling liquid from the filter-loop assembly through an additive-loop assembly, when the quality of separation of the recycling liquid achieved by the filter-loop assembly step is adequate, that includes the steps of:
      i. testing the separated recycling liquid to determine what additive compounds are needed, and the quantity of any said additive compounds needed, to achieve desired recycling;
      ii. adjusting additive metering valves to inject quantities of additive compounds into the separated recycling liquid determined by the testing;
      iii. directing the separated recycling liquid to flow by an additive suction "T"-joint;
      iv. directing additive compounds through the adjusted additive compound metering valves, and through the additive suction "T"-joint into the separated recycling liquid;
      v. directing the separated, additive-injected recycling liquid to flow out of the additive-loop assembly.

2. A method of recycling contaminated liquids, which comprises:
   a. pumping recycling liquid through a filter-loop assembly that includes the steps of:
      i. storing recycling liquid temporarily in a waste liquid holding tank;
      ii. adjusting the flow-rate of recycling liquid out of the waste liquid holding tank;
      iii. heating the flow-rate adjusted recycling liquid;
      iv. passing the heated recycling liquid through a mechanical separator;
      v. selectively directing the separated recycling liquid back to the waste liquid holding tank;
      vi. cooling the separated recycling liquid;
      vii. testing the separated recycling liquid to determine the quality of separation; and
   b. pumping the recycling liquid from the filter-loop assembly through an additive-loop assembly, when the quality of separation of the recycling liquid achieved by the filter-loop assembly step is adequate, that includes the steps of:
      i. storing separated recycling liquid temporarily in a clean liquid holding tank;
      ii. testing the separated recycling liquid to determine what additive compounds are needed, and the quantity of any said additive compounds needed, to achieve desired recycling;
      iii. directing the separated recycling liquid to flow by an additive suction "T"-joint and back to the clean liquid holding tank;
      iv. directing additive compounds through additive compound metering valves, and through the additive suction "T"-joint into the separated recycling liquid;
      v. re-testing the separated recycling liquid to determine whether the quantities of additive compounds injected into the separated recycling liquid are achieving the desired recycling;
      vi. adjusting the additive metering valves to inject quantities of additive compounds into the separated recycling liquid determined by the re-testing;
      vii. directing the separated, additive-injected recycling liquid to flow out of the additive-loop assembly when re-testing determines desired recycling has been achieved.

3. The method of claim 2, further comprising the steps of:
   a. transporting the filter-loop assembly and additive-loop assembly, to the site of stored recycling liquid, in a vehicle having a standard vehicle-transporting engine; and
   b. powering the pumping, heating and cooling of the recycling liquid within the filter-loop assembly and additive-loop assembly with energy provided by the engine.

4. The method of claim 2, further comprising the steps of:
   a. re-testing the separated recycling liquid, flowing through the filter-loop assembly, at periodic time intervals, to determine the quality of separation after separated recycling liquid has commenced being pumped out of the filter-loop assembly; and
   b. re-testing the additive-injected recycling liquid, flowing through the additive-loop assembly, at periodic time intervals, to determine whether the quantities of additive compounds injected int the recycling liquid continue to achieve the desired recycling, after separated, injected recycling liquid has commenced being directed to flow out of the additive-loop assembly.

5. In a liquid recycling apparatus of the type used for recycling contaminated industrial liquids, wherein recycling liquid flows through conventional intake piping, a pump, a screen filter, a heater, a mechanical separator, a cooler, and discharge piping, the improvement comprising a vehicle that transports and powers to apparatus, wherein the vehicle includes: an engine that transports the vehicle to the site of stored recycling liquid; a mechanical power takeoff shaft adjustably affixed to the engine that selectively powers the pump and mechanical separator; a standard engine-coolant system affixed to the engine, to remove heat from the engine, that is in fluid connection with the heater so that heat removed from the engine, while the engine is operating, heats recycling liquid flowing through the heater; and a standard vehicle air-conditioning system, affixed to the engine, to cool the interior of the vehicle, that is in fluid connection with the cooler so tht the air-conditioning system adjustably cools the recycling liquid flowing through the cooler.

6. In a liquid recycling apparatus of the type used for recycling contaminated industrial liquids, wherein recycling liquid passes by conventional intake piping through a screen filter, a heater, a mechanical separator, and discharge piping, the improvement comprising an additive-loop assembly affixed between the intake and discharge piping, wherein the additive-loop assembly includes: a clean liquid holding tank, in fluid connection with the intake piping, that selectively receives and holds recycling liquid from the intake piping; an additive-loop pump, in fluid connection with the clean liquid holding tank, that moves recycling liquid from the clean liquid holding tank; an additive suction "T"-joint in fluid connection, and positioned between, the clean liquid holding tank and the additive-loop pump; be additive manifold in fluid connection with the additive suction "T"-joint; a plurality of additive metering valves in fluid connection with the additive manifold; a plurality of additive compound containers, in fluid connection with the additive metering valves, that contain additive compounds, so that the additive compounds can be selectively sucked from their containers, at rates controlled by the additive metering valves, through the additive manifold, additive suction "T"-joint, and into the recycling liquid, when the recycling liquid is moving through the suction "T"-joint; and additive-loop test valve, in fluid connection with the additive-loop pump, that selectively discharges recycling liquid out of the additive-loop assembly for testing of the recycling liquid; and a discharge valve, in fluid connection with the additive-loop test valve, that selectively directs recycling liquid back to the clean liquid holding tank or out of the additive-loop assembly so that, when tests indicate that the recycling liquid has received proper amounts of the additives, the recycling liquid may be discharged out of the additive-loop assembly.

7. In a liquid recycling apparatus of the type used for recycling contaminated industrial liquids, wherein recycling liquid passes by conventional intake piping through a screen filter, a heater, a mechanical separator, and discharge piping, the improvement comprising a filter-loop assembly affixed between the intake and discharge piping, wherein the filter-loop assembly includes: a waste liquid holding tank that receives and holds recycling liquid; a filter-loop pump, in fluid connection with the waste liquid holding tank, that selectively moves recycling liquid from the waste liquid holding tank; a flow-rate control valve, in fluid connection with the filter-loop pump, through which the recycling liquid flows, so that the flow-rate of the recycling liquid can be adjusted; a heater in fluid connection with the filter-loop pump, that adjustably heats the recycling liquid; a centrifuge, in fluid connection with the heater, that adjustably separates unwanted liquids and particulate contaminants from the recycling liquid; a post-centrifuge pump, in fluid connection with the centrifuge, that moves recycling liquid from the centrifuge and selectively moves recycling liquid back to the waste liquid holding tank; a cooler, in fluid connection with the post-centrifuge pump that selectively receives recycling liquid from the post-centrifuge pump and adjustably cools the recycling liquid; and a filter-loop test valve, in fluid connection with the cooler, that selectively discharges recycling liquid out of the filter-loop assembly for testing of the recycling liquid, so that when tests indicate tghat the recycling liquid is properly filtered, the recycling liquid can be directed from the cooler, out of the filter-loop assembly.

8. The apparatus of claim 7, wherein the improvement further comprises a transparent filter-loop flow-rate gauge in fluid connection with, and positioned between, the heater and the centrifuge, so that recycling liquid flows from the heater through the filter-loop flow-rate gauge and to the centrifuge.

9. An apparatus for recycling contaminated liquids that comprises:
a. a filter-loop assembly, positioned to receive recycling liquid, that comprises:
  i. a waste liquid holding tank that receives and holds recycling liquid;
  ii. a filter-loop pump, in fluid connection with the waste liquid holding tank, that selectively moves recycling liquid from the waste liquid holding tank;
  iii. a flow-rate control valve, in fluid connection with the filter-loop pump, through which the recycling liquid flows, so that the flow-rate of the recycling liquid can be adjusted;
  iv. a heater, in fluid connection with the filter-loop pump, that adjustably heats the recycling liquid;
  v. a centrifuge in, fluid connection with the heater, that adjustably separates unwanted liquid and particulate contaminants from the recycling liquid;
  vi. a post-centrifuge pump, in fluid connection with the centrifuge, that moves recycling liquid from the centrifuge and selectively moves recycling liquid back to the waste liquid holding tank;
  vii. a cooler, in fluid connection with the post-centrifuge pump, that selectively receives recycling liquid from the post-centrifuge pump and adjustably cools the recycling liquid;
  viii. a filter-loop test valve, in fluid connection with the cooler, that selectively discharges recycling liquid out of the filter-loop assembly for testing of the recycling liquid, so that, when tests indicate that the recycling liquid is properly filtered, the recycling liquid can be directed from the cooler out of the filter-loop assembly; and
b. an additive-loop assembly, in fluid connection with the cooler of the filter-loop assembly, that comprises;
  i. a clean liquid holding tank, in fluid connection with the cooler, that selectively receives and holds recycling liquid from the cooler;
  ii. an additive-loop pump, in fluid connection with the clean liquid holding tank, that moves recycling liquid from the clean liquid holding tank;
  iii. an additive suction "T"-joint in fluid connection with, and positioned between, the clean liquid holding tank and the additive-loop pump;
  iv. an additive manifold in fluid connection with the additive suction "T"-joint;
  v. a plurality of additive metering valves in fluid connection with the additive manifold;
  vi. a plurality of additive compound containers, in fluid connection with the additive metering valves, that contain additive compounds, so that the additive compounds can be selectively sucked from their containers, at rates controlled by the additive metering valves, through the additive manifold, additive suction "T"-joint, and into the recycling liquid, when the recycling liquid is moving through the suction "T"-joint;
  vii. an additive-loop test valve, in fluid connection with the additive-loop pump, that selectively discharges recycling liquid out of the additive-loop assembly for testing of the recycling liquid;
  viii. a discharge valve, in fluid connection with the additive-loop test valve, that selectively directs recycling liquid back to the clean liquid holding tank or out of the additive-loop assembly so that, when tests indicate that the recycling liquid has received proper amounts of the additives, the recycling liquid may be discharged out of the additive-loop assembly.

10. The apparatus of claim 9, wherein the apparatus further comprises a transparent, filter-loop flow-rate gauge in fluid connection with, and positioned between, the heater and the centrifuge, so that recycling fluid flows from the heater, through the filter-loop flow-rate gauge and to the centrifuge.

11. The apparatus of claim 10, wherein the apparatus further comprises a neat-coolant additive injection mechanism in the additive-loop assembly, that comprises:

a. a neat-coolant additive container;
b. a neat-coolant feed pump, in fluid connection with the neat-coolant additive container;
c. a neat-coolant metering valve, in fluid connection with the neat-coolant feed pump, that controls the rate of flow of neat coolant as it leaves the neat-coolant feed pump; and
d. a neat-coolant suction "T"-valve, in fluid connection with, and positioned between, the neat-coolant metering valve and the recycling liquid, so that neat coolant can be selectively injected into the recycling liquid at a rate determined by the neat-coolant metering valve.

12. The apparatus of claim 11, wherein the flow-rate control valve, filter-loop test valve, transparent filter-loop flow-rate gauge, additive metering valves, neat-coolant metering valve, and additive-loop test valve are affixed to a master control panel.

13. An apparatus for recycling contaminated liquids, that comprises:

a. a vacuum mechanism that applies a suction force to a recycling liquid to draw it into the apparatus, and comprises:
 i. a vacuum blower that selectively develops the suction force;
 ii. a vacuum line, in fluid connection with the vacuum blower, that transmits the suction force;
 iii. a waste disposal tank, in fluid connection with the vacuum line, that receives and stores recycling liquid;
 iv. a waste disposal tank fine screen filter, in fluid connection with, and affixed to, the waste disposal tank, that intersects and filters recycling liquid entering the waste disposal tank;
 v. a vacuum hose, in fluid connection with the waste disposal tank fine screen filter, that adjustably applies the suction force to stored recycling liquid so that recycling liquid flows through the vacuum hose, waste disposal tank fine screen filter and into the waste disposal tank;

b. a filter-loop assembly, in fluid connection with the waste disposal tank, of the vacuum mechanism, that comprises:
 i. a waste liquid holding tank, in fluid connection with the waste disposal tank and the vacuum line, so that the recycling liquid flows from the waste disposal tank to the waste liquid holding tank when suction is applied to the waste liquid holding tank by the vacuum blower;
 ii. a filter-loop pump, in fluid connection with the waste liquid holding tank, that selectively moves recycling liquid from the waste liquid holding tank;
 iii. a flow-rate control valve, in fluid connection with the filter-loop pump, through which the recycling liquid flows, so that the flow-rate of the recycling liquid can be adjusted;
 iv. a heater, in fluid connection with the filter-loop pump, that adjustably heats the recycling liquid;
 v. a centrifuge, in fluid connection with the heater, that adjustably separates unwanted liquid and particulate contaminants from the recycling liquid;
 vi. a post-centrifuge pump, in fluid connection with the centrifuge, that moves recycling liquid from the centrifuge and selectively moves recycling liquid back to the waste liquid holding tank;
 vii. a cooler, in fluid connection with the post-centrifuge pump, that selectively receives recycling liquid from the post-centrifuge pump and adjustably cools the recycling liquid;
 viii. a filter-loop test valve, in fluid connection with the cooler, that selectively discharges recycling liquid out of the filter-loop assembly for testing of the recycling liquid, so that, when tests indicate that the recycling liquid is properly filtered, the recycling liquid can be directed from the cooler out of the filter-loop assembly; and c. an additive-loop assembly, in fluid connection with the cooler of the filter-loop assembly, that comprises:
 i. a clean liquid holding tank, in fluid connection with the cooler, that selectively receives and holds recycling liquid from the cooler;
 ii. an additive-loop pump, in fluid connection with the clean liquid holding tank, that moves recycling liquid from the clean liquid holding tank;
 iii. an additive suction "T"-joint in fluid connection with, and positioned between, the clean liquid holding tank and the additive-loop pump;
 iv. an additive manifold in fluid connection with the additive suotion "T"-joint;
 v. a plurality of additive metering valves in fluid connection with the additive manifold;
 vi. a plurality of additive compound containers, in fluid connection with the additive metering valves, that contain additive compounds, so that the additive compounds can be selectively sucked from their containers, at rates controlled by the additive metering valves, through the additive manifold, additive suction "T"-joint, and into the recycling liquid, when the recycling liquid is moving through the suction "T"-joint;
 vii. an additive-loop test valve, in fluid connection with the additive-loop pump, that selectively discharges recycling liquid out of the filter-loop assembly for testing of the recycling liquid;
 viii. a discharge valve, in fluid connection with the additive-loop test valve, that selectively directs recycling liquid back to the clean liquid holding tank or out of the additive-loop assembly so that, when tests indicate that the recycling liquid has received proper amounts of the additives, the recycling liquid may be discharged out of the additive-loop assembly.

14. The apparatus of claim 13, wherein the apparatus further comprises:

a. a vacuum hose fine screen filter, in fluid connection with, and intersecting, the vacuum hose, so that recycling liquid flowing through the vacuum hose is filtered by the vacuum hose fine screen filter;

b. a waste liquid holding tank fine screen filter, in fluid connection with, and affixed to, the waste liquid holding tank, that intersects and filters recycling liquid entering the waste liquid holding tank.

15. The apparatus of claim 13, wherein the apparatus further comprises a transparent filter-loop flow-rate gauge in fluid connection with, and positioned between, the heater and centrifuge, so that recycling liquid flows from the heater, through the filter-loop flow-rate gauge and to the centrifuge.

16. The apparatus of claim 15, wherein the apparatus further comprises a neat-coolant additive injection mechanism in the additive-loop assembly, that comprises:
   a. a neat-coolant additive container;
   b. a neat-coolant feed pump, in fluid connection with the neat-coolant additive container;
   c. a neat-coolant metering valve, in fluid connection with the neat-coolant feed pump, that controls the rate of flow of neat coolant as it leaves the neat-coolant feed pump; and
   d. a neat-coolant suction "T"-valve, in fluid connection with, and positioned between, the neat-coolant metering valve and the recycling liquid, so that neat coolant can be selectively injected into the recycling liquid at a rate determined by the neat-coolant metering valve.

17. The apparatus of claim 16, wherein the flow-rate control valve, filter-loop test valve, transparent filter-loop test gauge, additive metering valves, neat-coolant metering valve, and additive-loop test valve are affixed to a master control panel.

18. An apparatus for recycling contaminated liquids that comprises:
   a. a filter-loop assembly, positioned to receive recycling liquid, that comprises:
      i. a waste liquid holding tank that receives and holds recycling liquid;
      ii. a filter-loop pump, in fluid connection with the waste liquid holding tank, that selectively moves recycling liquid from the waste liquid holding tank;
      iii. a flow-rate control valve, in fluid connection with the filter-loop pump, through which the recycling liquid flows, so that the flow-rate of the recycling liquid can be adjusted;
      iv. a heater, in fluid connection with the filter-loop pump, that adjustably heats the recycling liquid;
      v. a centrifuge in, fluid connection with the heater, that adjustably separates unwanted liquid and particulate contaminants from the recycling liquid;
      vi. a post-centrifuge pump, in fluid connection with the centrifuge, that moves recycling liquid from the centrifuge and selectively moves recycling liquid back to the waste liquid holding tank;
      vii. a cooler, in fluid connection with the post-centrifuge pump, that selectively receives recycling liquid from the post-centrifuge pump and adjustably cools the recycling liquid;
      viii. a filter-loop test valve, in fluid connection with the cooler, that selectively discharges recycling liquid out of the filter-loop assembly for testing of the recycling liquid, so that, when tests indicate that the recycling liquid is properly filtered, the recycling liquid can be directed from the cooler out of the filter-loop assembly;
   b. an additive-loop assembly, in fluid connection with the cooler of the filter-loop assembly, that comprises:
      i. a clean liquid holding tank, in fluid connection with the cooler, that selectively receives and holds recycling liquid from the cooler;
      ii. an additive-loop pump, in fluid connection with the clean liquid holding tank, that moves recycling liquid from the clean liquid holding tank;
      iii. an additive suction "T"-joint in fluid connection with, and positioned between, the clean liquid holding tank and the additive-loop pump;
      iv. an additive manifold in fluid connection with the additive suction "T"-joint;
      v. a plurality of additive metering valves in fluid connection with the additive manifold;
      vi. a plurality of additive compound containers, in fluid connection with the additive metering valves, that contain additive compounds, so that the additive compounds can be selectively sucked from their containers, at rates controlled by the additive metering valves, through the additive manifold, additive suction "T"-joint, and into the recycling liquid, when the recycling liquid is moving through the suction "T"-joint;
      vii. an additive-loop test valve, in fluid connection with the additive-loop pump, that selectively discharges recycling liquid out of the additive-loop assembly for testing of the recycling iquid;
      viii. a discharge valve, in fluid connection with the additive-loop test valve, that selectively directs recycling liquid back to the clean liquid holding tank or out of the additive-loop assembly so that, when tests indicate that the recycling liquid has received proper amounts of the additives, the recycling liquid may be discharged out of the additive-loop assembly; and
   c. a vehicle that transports and powers the filter-loop assembly, and additive-loop assembly, that comprises:
      i. an engine that moves the vehicle to a storage site of contaminated liquid;
      ii. a power takeoff shaft, adjustably affixed to the engine, that selectively powers the filter-loop pump, centrifuge, post-centrifuge pump and additive-loop pump.

19. The apparatus of claim 18, wherein the engine is mechanically affixed to, and powers, a standard vehicle airconditioning system, to cool the interior of the vehicle, that is in fluid connection with the cooler of the filter-loop assembly, so that the air-conditioning system adjustably cools the recycling liquid flowing through the cooler.

20. The apparatus of claim 18, wherein the engine includes a standard engine-coolant system, to remove heat from the engine, that is in fluid connection with the heater of the filter-loop assembly, so that heat removed from the engine, while the engine is operating, heats recycling liquid flowing through the heater.

21. The apparatus of claim 20, wherein the engine is mechanically affixed to, and powers, a standard vehicle airconditioning system, to cool the interior of the vehicle, that is in fluid connection with the cooler of the filter-loop assembly, so that the air-oonditioning system adjustably cools the recycling liquid flowing through the cooler.

22. The apparatus of claim 21, wherein the apparatus further comprises a transparent, filter-loop flow-rate gauge in fluid connection with, and positioned between, the heater and the centrifuge, so that recycling liquid flows from the heater, through the filter-loop flow-rate gauge and to the centrifuge.

23. The apparatus of claim 22, wherein the apparatus further comprises a neat-coolant additive injection mechanism in the additive-loop assembly, that comprises:
 a. a neat-coolant additive container;
 b. a neat-coolant feed pump, in fluid connection with the neat-coolant additive container;
 c. a neat-coolant metering valve, in fluid connection with the neat-coolant feed pump, that controls the rate of flow of neat coolant as it leaves the neat-coolant feed pump; and
 d. a neat-coolant suction "T"-valve in fluid connection with, and positioned between, the neat-coolant metering valve and the recycling liquid, so that neat coolant can be selectively injected into the recycling liquid at a rate determined by the neat-coolant metering valve.

24. The apparatus of claim 23, wherein the flow-rate control valve, filter-loop test valve, transparent filter-loop flow-rate gauge, additive metering valves, neat-coolant metering valve, and additive-loop test valve are affixed to a master control panel.

* * * * *